US012215761B2

(12) United States Patent
Hall et al.

(10) Patent No.: US 12,215,761 B2
(45) Date of Patent: Feb. 4, 2025

(54) LINEAR MOTION DEVICE

(71) Applicant: Hall Labs LLC, Provo, UT (US)

(72) Inventors: David R. Hall, Provo, UT (US); Michael Hall, Provo, UT (US); Cody Rees, Provo, UT (US)

(73) Assignee: Hall Logic, Inc., Provo, UT (US)

( * ) Notice: Subject to any disclaimer, the term of this patent is extended or adjusted under 35 U.S.C. 154(b) by 1303 days.

(21) Appl. No.: 16/836,853

(22) Filed: Mar. 31, 2020

(65) Prior Publication Data
US 2021/0301907 A1     Sep. 30, 2021

(51) Int. Cl.
| F16H 19/06 | (2006.01) |
| B66B 1/34 | (2006.01) |
| B66B 1/52 | (2006.01) |
| B66B 9/00 | (2006.01) |
| B66C 11/18 | (2006.01) |
| B66C 19/00 | (2006.01) |

(52) U.S. Cl.
CPC ........... *F16H 19/06* (2013.01); *B66B 1/3461* (2013.01); *B66B 1/52* (2013.01); *B66B 9/00* (2013.01); *B66C 11/18* (2013.01); *B66C 19/00* (2013.01); *B66B 2201/4623* (2013.01); *B66B 2201/4638* (2013.01); *B66B 2201/4653* (2013.01); *F16H 2019/0686* (2013.01)

(58) Field of Classification Search
CPC ............. F16H 19/06; F16H 2019/0686; B66B 1/3461; B66B 1/52; B66B 9/00; B66B 2201/4623; B66B 2201/4638; B66B 2201/4653; B66B 11/0476; B66C 11/18; B66C 19/00; B66C 13/18; B66D 3/26; B66D 3/18; B66D 1/36; B66D 2700/0141; B66D 2700/0191; B66D 3/04
See application file for complete search history.

(56) References Cited

U.S. PATENT DOCUMENTS

| 6,182,915 B1 * | 2/2001 | Kvalsund ............. B66D 1/7405 |
| | | 254/290 |
| 8,689,636 B2 * | 4/2014 | Bednarczyk ........... B65H 63/00 |
| | | 73/800 |
| 2021/0285525 A1 * | 9/2021 | Hall ........................ B66D 1/36 |

* cited by examiner

*Primary Examiner* — Jeffrey Donels

(57) ABSTRACT

A slider has a drum with alternating alpha and beta grooves, first stacked pulleys, and second stacked pulleys. First and second end pulleys are at opposite ends of the slider. A line wraps as a loop from the last beta groove, around the first end pulley, to the last alpha groove, back and forth around the first stacked pulleys, off the first alpha groove, around the second end pulley, to the first beta groove, back and forth around the second stacked pulleys, and back to the last beta groove. When the drum or the end pulleys are driven, the difference in circumferences of the grooves causes the slider to move toward one of the first or second end pulleys.

20 Claims, 11 Drawing Sheets

LINEAR MOTION DEVICE

TECHNICAL FIELD

This disclosure relates generally to capstan-effect motive devices.

BACKGROUND

Movement of objects linearly, both up and down and side to side, is an important function of transport. Many systems that utilize ropes and lines, such as winches and hoists, require braking systems for safety and many have to spool the line around a drum where the lines overlap and rub, causing wear and other issues. Improved linear motion devices are needed.

SUMMARY

In a first aspect, the disclosure provides a device for moving an object linearly. A line is in the form of a loop. A slider has a plurality of first stacked pulleys with first stacked grooves, a plurality of second stacked pulleys with second stacked grooves, and a drum with a plurality of alpha grooves alternating with a plurality of beta grooves. The circumference of each alpha groove of the drum is greater than the circumference of each beta groove on the drum and the circumference of each first stacked groove is greater than the circumference of each second stacked pulleys. The long axes of the plurality of first stacked pulleys, the drum, and the plurality of second stacked pulleys are parallel in a plane. The plurality of first stacked pulleys are adjacent a first end of the slider. The plurality of second stacked pulleys are adjacent a second end of the slider. The drum is between the plurality of first stacked pulleys and the plurality of second stacked pulleys. A first end pulley rotates at a first angle so as to transition the line passing over a last groove of the beta grooves to pass over a last groove of the alpha grooves. The plurality of first stacked pulleys rotate at a second angle so as to transition the line passing over the last groove of the alpha grooves to pass over a last groove of the first stacked grooves and onto a previous groove of the alpha grooves. A second end pulley rotates at a third angle so as to transition the line passing over a first groove of the alpha grooves onto a first groove of the beta grooves. The plurality of second stacked pulleys rotate at a fourth angle so as to transition the line passing over the first groove of the beta grooves to pass over a first groove of the second stacked grooves and onto a next groove of the alpha grooves. When any of the drum, the first end pulley, or the second end pulley is driven, the difference in the circumferences of the alpha grooves and the beta grooves and the difference in the circumferences of the first stacked grooves and the second stacked grooves causes the slider to move toward one of the first or second end pulleys.

In a second aspect, the disclosure provides a device for moving an object linearly. A line is in the form of a loop. A slider has a plurality of first stacked pulleys with first stacked grooves, a plurality of second stacked pulleys with second stacked grooves, a first drum with a plurality of alpha grooves, and a second drum with a plurality of beta grooves. The circumference of each alpha groove of the first drum is greater than the circumference of each beta groove on the second drum and the circumference of each first stacked groove is greater than the circumference of each second stacked pulleys. The long axes of the plurality of first stacked pulleys, the first drum, the second drum, and the plurality of second stacked pulleys are parallel in a plane. The plurality of first stacked pulleys are adjacent a first end of the slider, the plurality of second stacked pulleys are adjacent a second end of the slider, and the first drum and second drum are adjacent and parallel each other and are between the plurality of first stacked pulleys and the plurality of second stacked pulleys. A first end pulley rotates at a first angle so as to transition the line passing over a first groove of the beta grooves to pass over a first groove of the alpha grooves of the drum. The first stacked pulleys rotate at a second angle so as to transition the line passing over the alpha grooves of the drum onto a next groove of the alpha grooves. A second end pulley rotates at a third angle so as to transition the line passing over a last groove of the alpha grooves onto a first groove of the beta grooves of the drum. The second stacked pulleys rotate at a fourth angle so as to transition the line passing over the beta grooves of the drum onto a next groove of the beta grooves. When any of the drum, the first end pulley, or the second end pulley is driven, the difference in the circumferences of the alpha grooves and the beta grooves and the difference in the circumferences of the first stacked grooves and the second stacked grooves causes the slider to move toward one of the first or second end pulleys.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
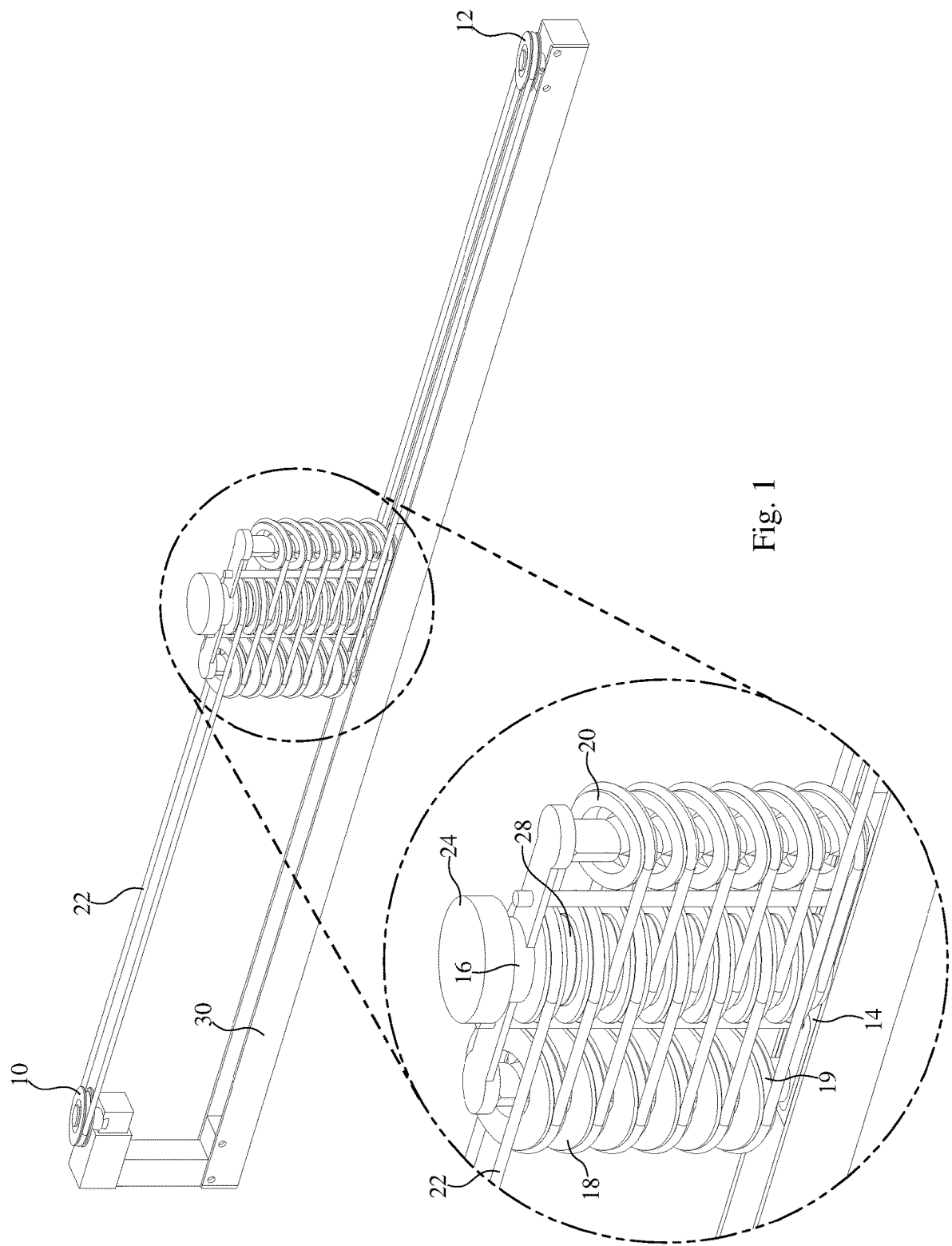
FIG. 1 is an isometric view of a device for moving an object linearly with a close-up view of a slider unit.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "line" is meant to refer to any device or material that is long, cylindrical, thin, flexible, and having a high tensile strength. Preferably, this will be a braided wire, but ropes, cords, string, twine, cable, strand, chains and combinations thereof may be used as well.

As used herein, "loop" with reference to a line means the end of the line is connected to the beginning of the line.

As used herein, "capstan effect" is meant to refer to the small holding force exerted on a line by one side of a cylinder and the line therefore being able to carry a much larger loading force on the other side, as shown in the Capstan equation. Rotation of the cylinder multiplies the applied tension by the friction between the line and the cylinder.

Capstan-effect devices are used to lift and pull objects, but typical capstan-effect devices have some limitations. The line wrapping around the drum overlaps or rubs against itself. The line naturally would exit and enter typical capstan-effect devices at whatever location the line comes off the drum. These and other limitations are overcome in the present invention. The present invention is a capstan-effect device that uses a drum and stacked pulleys to cause travel of a sliding support. In a preferred embodiment, the drum has alternating grooves of alternating circumferences, termed alpha and beta grooves. Alpha grooves align with a set of first stacked pulleys while beta grooves align with a set of second stacked pulleys. The drum is between the first and second stacked pulleys and all are parallel to one another. Alpha grooves may be larger than beta grooves, or vice versa. The drum and stacked pulleys are all mounted to the sliding support, or "slider." At either end of the slider are a first end pulley and a second end pulley. A line wraps in a continuous loop from the end pulleys and through a combination of the drum and stacked pulleys, as explained next. The first end pulley rotates at a first angle so that as the line passes from a last of the beta grooves and around the first end pulley, the line passes over a last of the alpha grooves. The line then passes back and forth between the alpha grooves and the first stacked pulleys as follows. The first stacked pulleys rotate at a second angle so that as the line passes from the alpha grooves and around the first stacked pulleys it passes onto a previous groove of the alpha grooves. The second end pulley rotates at the first angle so that as the line passes from a first of the alpha grooves and around the second end pulley, the line passes over a first of the beta grooves. The line then passes back and forth between the beta grooves and the second stacked pulleys as follows. The second stacked pulleys rotate at a third angle so that as the line passes from the beta grooves and around the second stacked pulleys it passes onto a next groove of the beta grooves. When any of the drum, the first end pulley, or the second end pulley is driven, such as by hand or a motor, the difference in the circumferences of the alpha and beta grooves and the first stacked grooves and the second stacked grooves causes the slider to move toward either the first or second end pulleys. The slider thereby moves linearly. In a preferred embodiment, the slider has an object attached and carries the object. One advantage of this device is that the mechanical advantage allows for a low-torque, high-speed motor to be used without need for a gearbox. This increases efficiency while lowering noise and cost.

Figure 2:
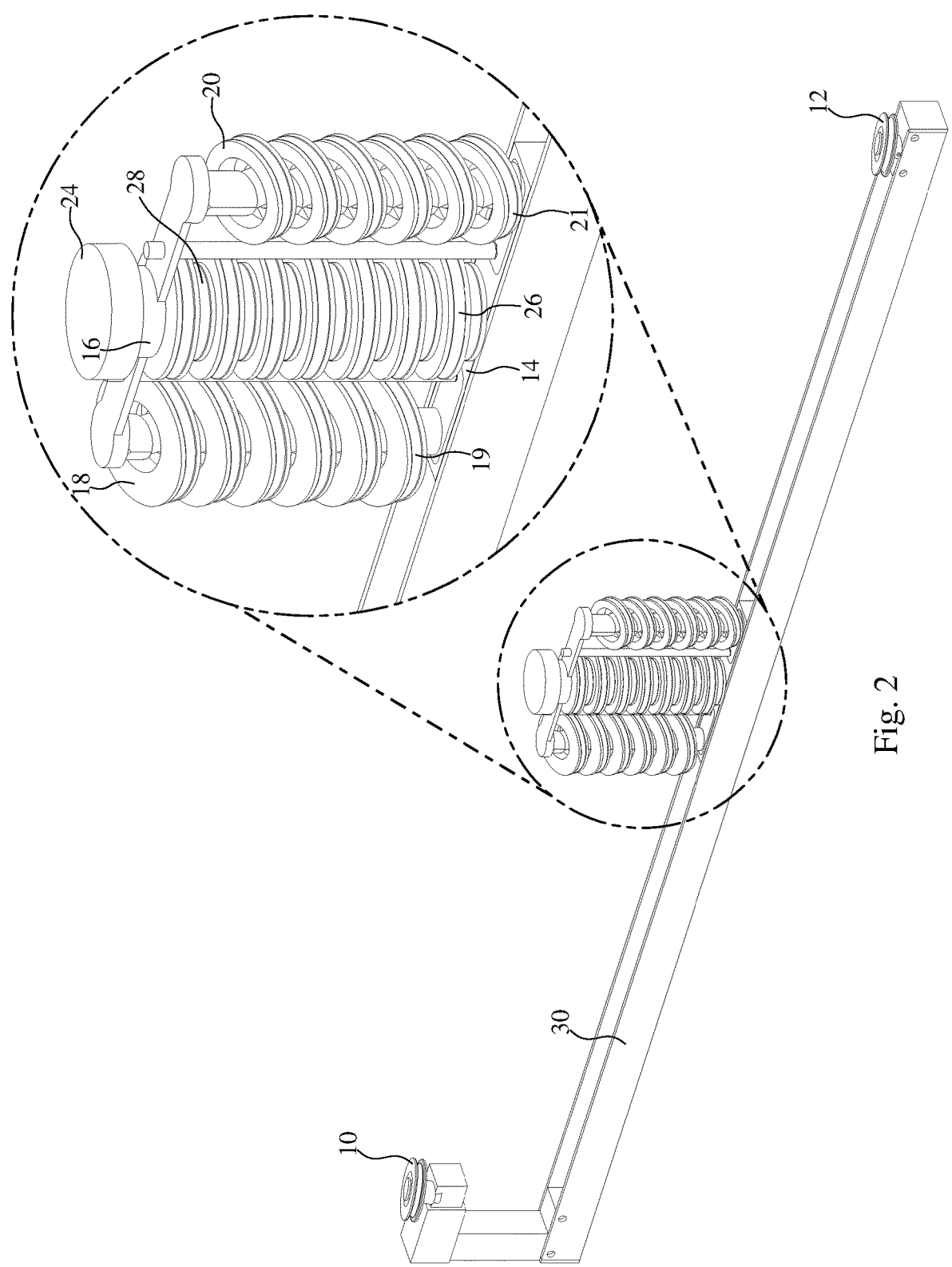
FIG. 2 is the isometric view of FIG. 1 without the line.
Figure 3:
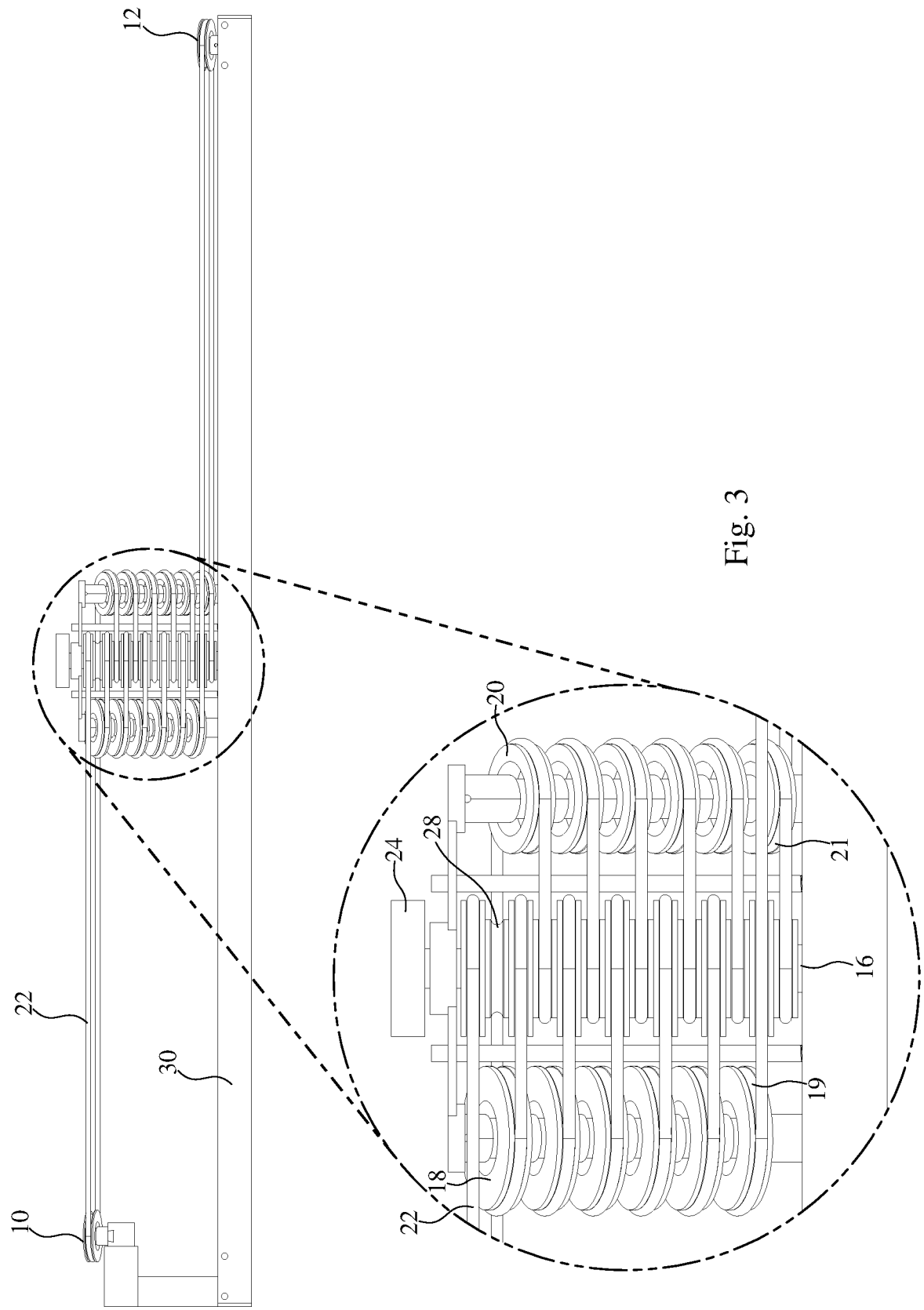
FIG. 3 is a front-elevation view of the device of FIG. 1 with a close-up view of the slider unit.
Figure 4:
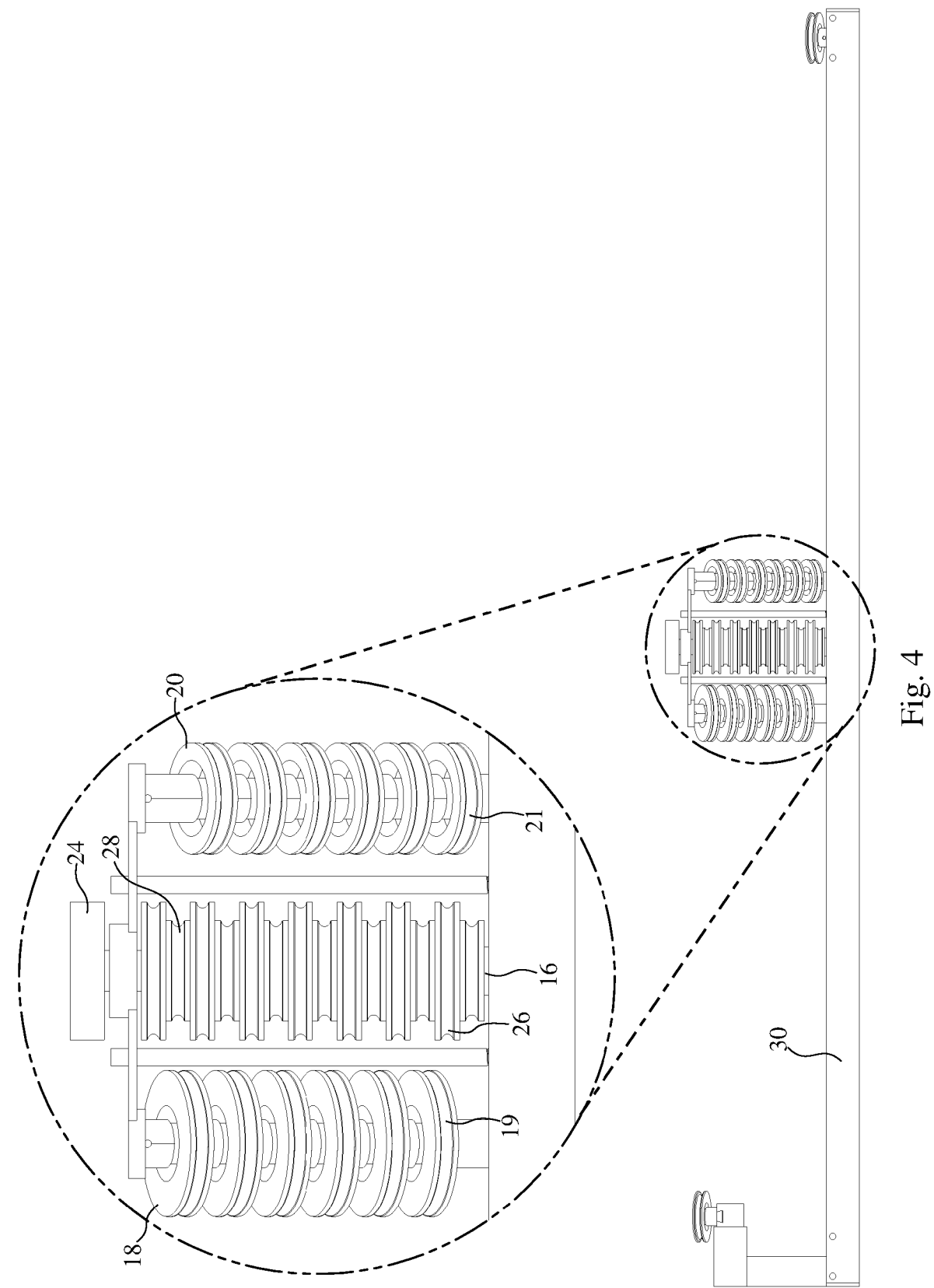
FIG. 4 is the elevation view of FIG. 3 without the line.
Figure 5:
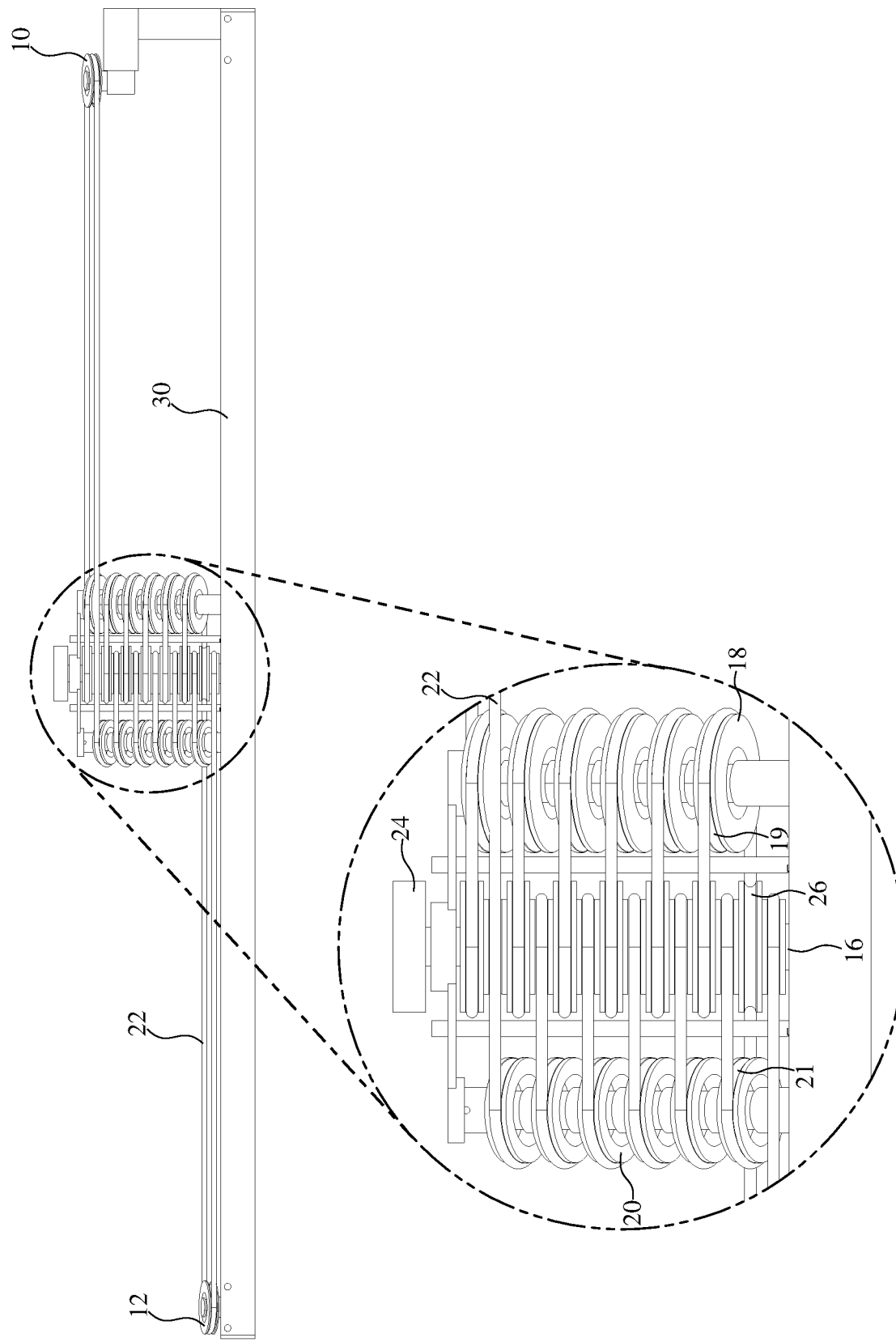
FIG. 5 is a back-elevation view of the device of FIG. 1 with a close-up view of the slider unit.
Figure 6:
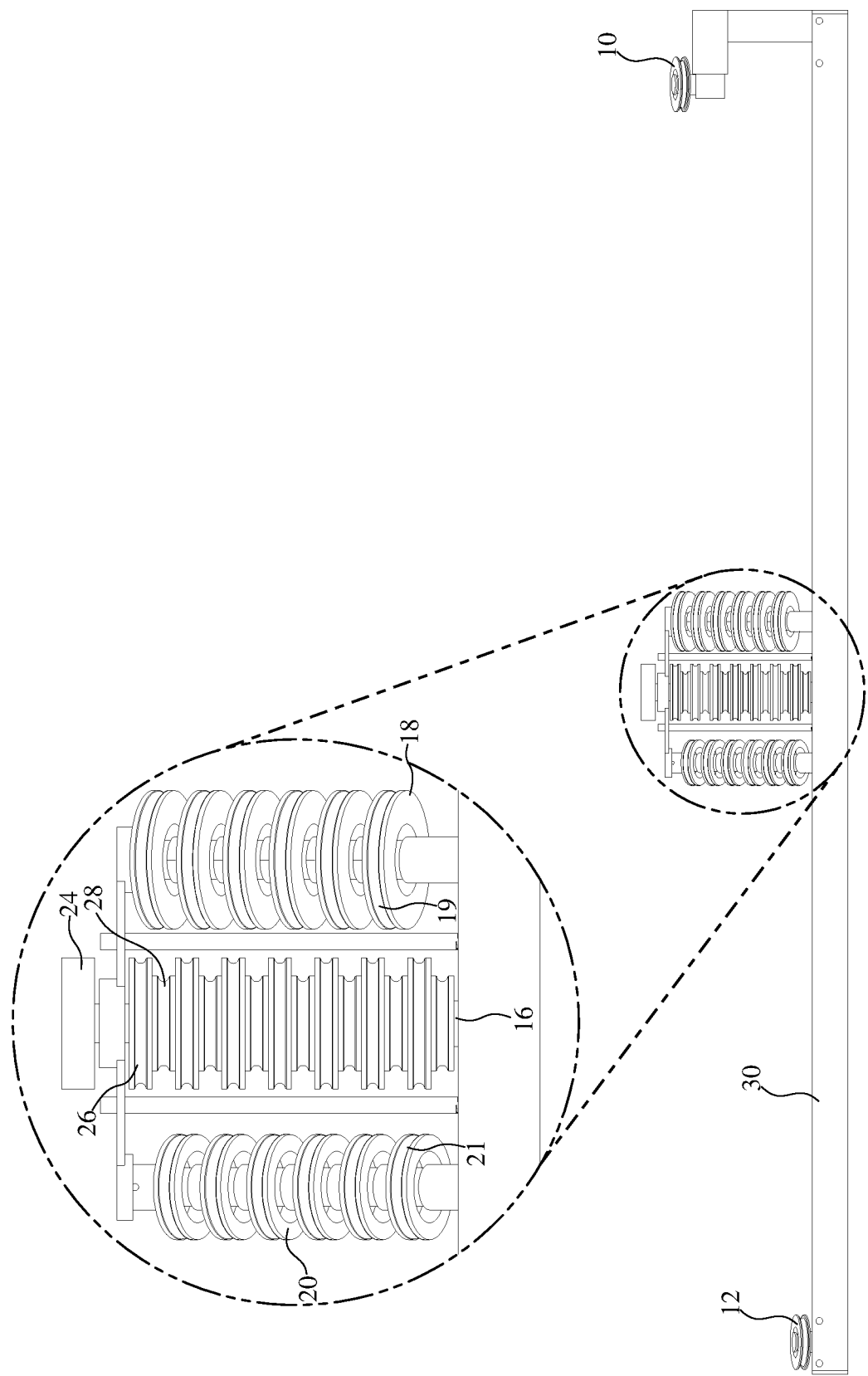
FIG. 6 is the elevation view of the device of FIG. 5 without the line.
Figure 8:
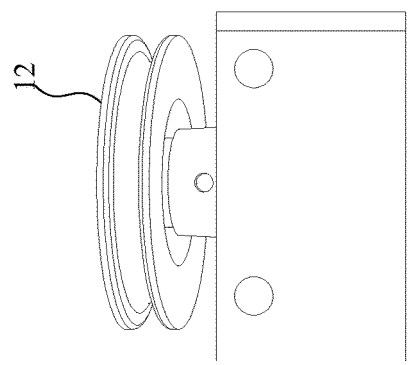
FIG. 8 is a front-elevation view of the second end pulley of FIGS. 1-6.
Figure 10:
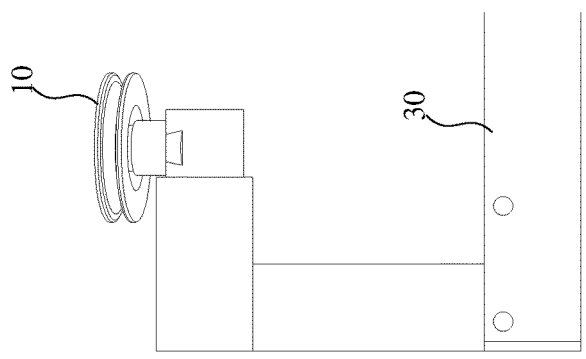
FIG. 10 is a front-elevation view of the first end pulley of FIGS. 1-6.
Figure 7:
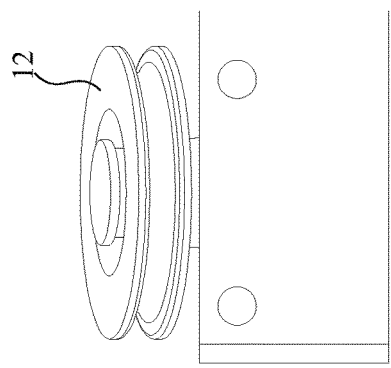
FIG. 7 is a back-elevation view of a second end pulley of FIGS. 1-6.
Figure 9:
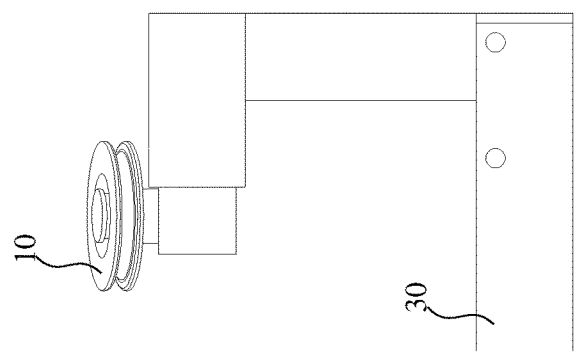
FIG. 9 is a back-elevation view of a first end pulley of FIGS. 1-6.

Now referring to FIG. 1, FIG. 1 is an isometric view of a device for moving an object linearly with a close-up view of a slider unit that may be used in one embodiment of the present invention. FIG. 2 is the isometric view of FIG. 1 without the line. FIG. 3 is a front-elevation view of the device of FIG. 1 with a close-up view of the slider unit. FIG. 4 is the elevation view of FIG. 3 without the line. FIG. 5 is a back-elevation view of the device of FIG. 1 with a close-up view of the slider unit. FIG. 6 is the elevation view of the device of FIG. 5 without the line. FIG. 7 is a back-elevation view of a second end pulley of FIGS. 1-6. FIG. 8 is a front-elevation view of the second end pulley of FIGS. 1-6. FIG. 9 is a back-elevation view of a first end pulley of FIGS. 1-6. FIG. 10 is a front-elevation view of the first end pulley of FIGS. 1-6. A line 22 is in the form of a loop. A slider 14 has a drum 16, a first stack of pulleys 18, and a second stack of pulleys 20. The drum 16 has a drive handle 24 that a user can turn. In preferred embodiments, the drive handle 24 is replaced by a motor. The drum 16 consists of alternating alpha grooves 26 and beta grooves 28, with the alpha grooves 26 having a greater circumference than the beta grooves 28. In this embodiment, the first of the beta grooves 28 is adjacent the slider 14. In other embodiments, the first of the alpha grooves 26 is adjacent the slider 14. The pulleys of the first stack of pulleys 18 have first stacked grooves 19. The pulleys of the second stack of pulleys 20 have second stacked grooves 21. The first stacked grooves 19 have a greater circumference than the second stacked grooves 21. The drum 16 is between the first stacked pulleys 18 and the second stacked pulleys 20, and the long axes of all three are parallel in a plane. The first stacked pulleys 18 are adjacent a first end of the slider 14 and the second stacked pulleys 20 are adjacent the opposite end of the slider 14. The slider 14 slides along a track 30. At one end of the track 30 is a first end pulley 10. At the opposite end of the track 30 is a second end pulley 12. The first end pulley 10 is elevated and tilted at a first angle and thereby aligns with the last grooves of the alpha and beta grooves 26 and 28. The second end pulley 12 is attached to the track 30 and tilted at the first angle and thereby aligns with the first grooves of the alpha and beta grooves 26 and 28. The first end pulley 10 rotates at the first angle so as the line 22 passes over a last groove of the beta grooves 28 and around the first end pulley 10, the line 22 is transitioned to pass over a last groove of the alpha grooves 26. The plurality of stacked pulleys 18 rotate at a second angle so as the line 22 comes off the alpha grooves 26 and around the first stacked grooves 19, the line 22 is transitioned to pass over a previous groove of the alpha grooves 26. The second end pulley 12 rotates at the first angle so as the line 22 passes over a first groove of the alpha grooves 26 and around the second end pulley 12, the line 22 is transitioned to pass over a first groove of the beta grooves 28. The plurality of stacked pulleys 20 rotate at a third angle so as the line 22 comes off the beta grooves 28 and around the second stacked grooves 21, the line 22 is transitioned to pass over a next groove of the beta grooves 28. In a preferred embodiment, the drum 16 is driven by the handle or motor 24, and the difference in circumference of the alpha grooves 26 and the beta grooves 28 and the difference in circumference of the first stacked grooves 19 and the second stacked grooves 21 causes the slider to move toward one of the first or second end pulleys 10 and 12 by the capstan effect.

In other embodiments, the first, second, or both end pulleys are replaced by two or more pulleys to accomplish the transition angle and distance with smaller pulleys.

In some embodiments, the first, second, or both end pulleys have a tensioner, such as a spring or a weight, that pulls the first and second end pulleys away from each other, resulting in tension in the line, enhancing or enabling the capstan effect in the device. In other embodiments, the friction between the line and the grooves is sufficient to provide the tension needed for the capstan effect. In some embodiments, the surfaces of the grooves are sufficiently rough to cause sufficient friction to eliminate the need for the spring to provide tension on the line—the friction provides all the tension required.

The surface of the grooves is preferably designed so as to provide the right balance between friction and wear on the line. In other words, the total surface of the grooves that engages the line need to have enough friction, i.e. grip, with the line so that the line can be pulled by rotation of the drive cylinder. Likewise, the surface of the grooves should not have so much friction, e.g. roughness, so that the line wears unnecessarily as it is passed over the grooves repeatedly.

The more grooves and the bigger the area of contact between the grooves and the line means that each groove needs less friction. The fewer the grooves, the greater the friction required on the surface or the greater the counterweight or force supplied by another tensioning device. The surface of the grooves can be tailored with special coatings, such as a soft polymeric coating, e.g. urethane or rubber, that would provide a better grip on the line. Alternatively, the surface of the grooves can be roughened, for example by etching, abrading or the like. Also, the outer surface of the line itself may be tailored with polymers coatings and the like, so as to provide more grip on the rollers.

In some embodiments, the slider 14 is attached to a load and carries it laterally or vertically.

In a preferred embodiment, the first stacked grooves and the alpha grooves do not have the same circumference as the first stacked pulleys are at an angle, so their circumference is slightly larger than the circumference of the alpha grooves. The size of the pulleys is such that the rope does a 180° turn and goes straight into the groove of the next pulley. The same is true of the relative circumferences of the beta grooves and the second stacked grooves.

The smaller the difference between the circumferences of the alpha and beta grooves, the less torque required to turn the drum, and the less linear motion created. A larger difference leads to a higher required drive torque, but more linear motion.

Figure 11:
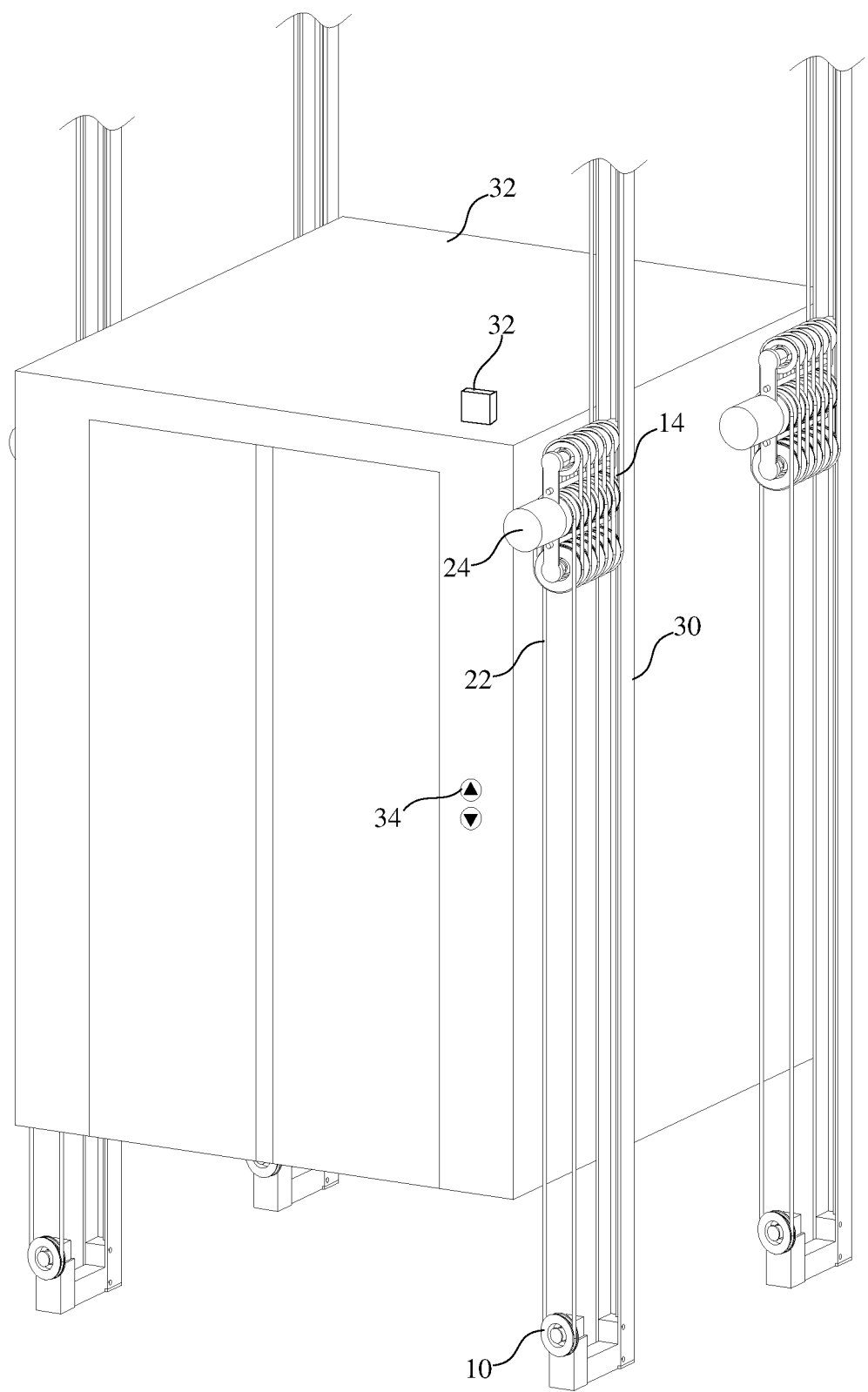
FIG. 11 is an isometric view of an elevator equipped with four devices of FIGS. 1-10.

FIG. 11 is an isometric view of an elevator equipped with four of the devices of FIGS. 1-10 that may be used in one embodiment of the present invention. The devices are mounted to the sliders 14 to the four top corners of the sides of the elevator 40. The first end pulley 10 attaches to the bottom of the elevator shaft and the second end pulley (not shown) attaches at the top of the elevator shaft. The motors 24 turn the drums 16 of the devices, causing the devices and therefore the elevator 32 to climb up or down the lines 22 due to the capstan effect. Call buttons 34 and floor buttons (inside—not shown) signal the controller 32. The controller 32 starts and stops the motors 24 to climb the elevator to the desired elevation.

One benefit of the present invention is that the elevator cannot be lowered if the drum or end pulleys are not actively turned as the capstan effect acts as a friction lock, meaning that no locking mechanism is required in case of power loss, only the weight, line friction, or other line tensioning device. This makes the elevator inherently safer than many traditional lifting devices.

Figure 12:
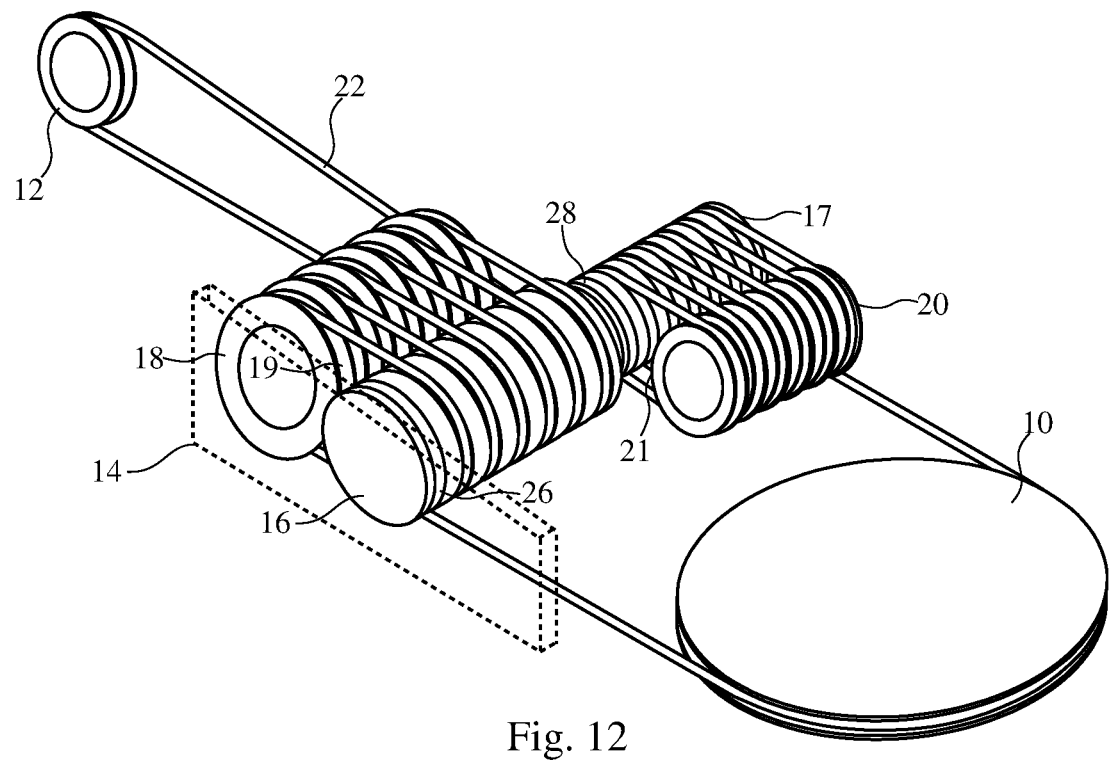
FIG. 12 is an isometric view of a device for moving an object linearly.

FIG. 12 is an isometric view of a device for moving an object linearly that may be used in one embodiment of the present invention. A line 22 is in the form of a loop. A slider 14 (shown in dashed lines to show features behind the slider 14) has a first drum 16, a first stack of pulleys 18, and a second stack of pulleys 20 mounted on the slide 14. The first drum 16 has a second drum 17 mounted parallel upon the first drum 16. Mounting shafts for the pulleys and drums are not shown for clarity. The drums 16 and 17 are driven by a motor (not shown). The first drum 16 has alpha grooves 26 and the second drum 17 has beta grooves 28. The alpha grooves 26 have a greater circumference than the beta grooves 28. The drums 16 and 17 are driven together on the same shaft. The pulleys of the first stack of pulleys 18 have first stacked grooves 19. The pulleys of the second stack of pulleys 20 have second stacked grooves 21. The first stacked grooves 19 have a greater circumference than the second stacked grooves 21. The drum 16 is between the first stacked pulleys 18 and the second stacked pulleys 20, and the long axes of all three are parallel in a plane. The first stacked pulleys 18 are adjacent a first end of the slider 14 and the second stacked pulleys 20 are adjacent the opposite end of the slider 14. The slider 14 slides along a track (not shown). At one end of the track 30 is a first end pulley 10. At the opposite end of the track is a second end pulley 12. The second end pulley 12 is elevated and tilted at a first angle and thereby aligns with the last groove of the alpha grooves 26 and the first groove of the beta grooves 28. The first end pulley 10 is attached to the track and tilted at a second angle and thereby aligns with the first groove of the alpha grooves 26 and the last groove of the beta grooves 28. The first end pulley 10 rotates at the first angle so as the line 22 passes over a last groove of the beta grooves 28 and around the first end pulley 10, the line 22 is transitioned to pass over a first groove of the alpha grooves 26. The plurality of stacked pulleys 18 rotate at a third angle so as the line 22 comes off the alpha grooves 26 and around the first stacked grooves 19, the line 22 is transitioned to pass over a next groove of the alpha grooves 26. The second end pulley 12 rotates at the second angle so as the line 22 passes over a last groove of the alpha grooves 26 and around the second end pulley 12, the line 22 is transitioned to pass over a first groove of the beta grooves 28. The plurality of stacked pulleys 20 rotate at a fourth angle so as the line 22 comes off the beta grooves 28 and around the second stacked grooves 21, the line 22 is transitioned to pass over a next groove of the beta grooves 28. In a preferred embodiment, the drums 16 and 17 are driven by the motor 24 and the difference in circumference of the alpha grooves 26 and the beta grooves 28 and the difference in circumference of the first stacked grooves 19 and the second stacked grooves 21 causes the slider 14 to move toward one of the first or second end pulleys 10 and 12 by the capstan effect. In one embodiment, a last of the alpha grooves 26 is larger than the remainder of the alpha grooves and a last of the beta grooves 28 is larger than the rest of the beta grooves. This increases the tension in the line, increasing the capstan effect.

Figure 13:
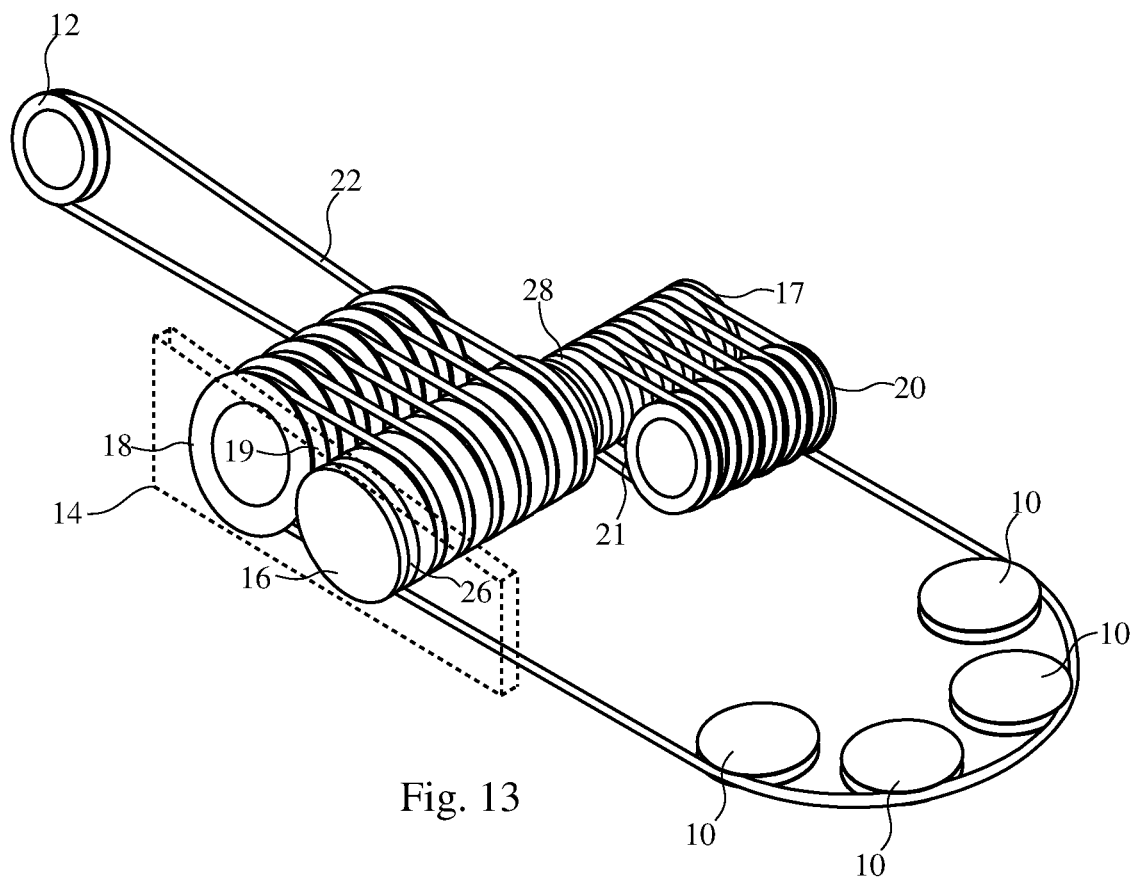
FIG. 13 is an isometric view of a device for moving an object linearly.
Figure 14:
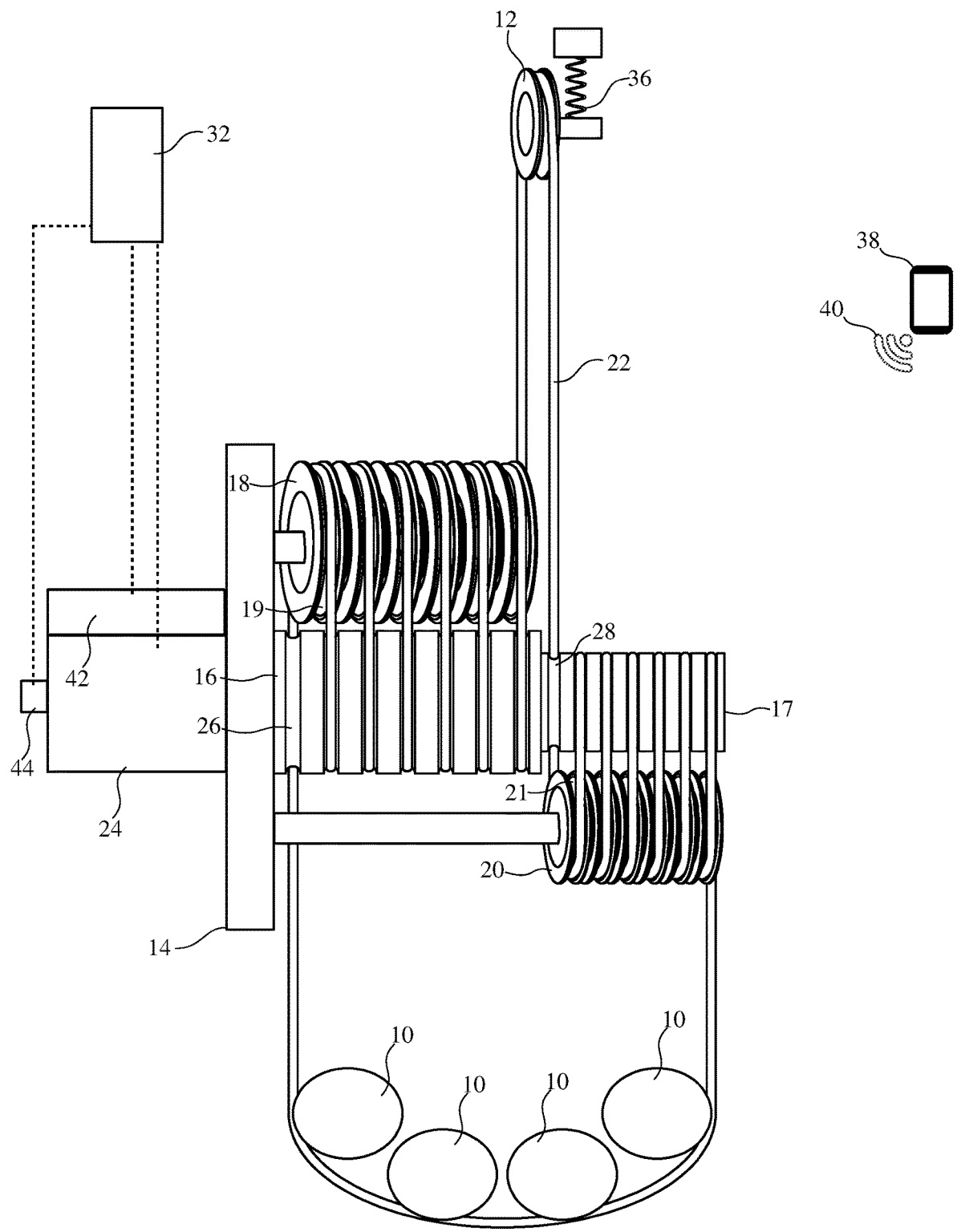
FIG. 14 is a side view of the device of FIG. 13.

FIG. 13 is an isometric view of a device for moving an object linearly that may be used in one embodiment of the present invention. FIG. 14 is a side view of the device of FIG. 13. A line 22 is in the form of a loop. A slider 14 (shown in dashed lines in FIG. 13, normal in FIG. 14) has a first drum 16, a first stack of pulleys 18, and a second stack of pulleys 20 mounted on the slide 14. The first drum 16 has a second drum 17 mounted parallel and in line with the first drum 16. Mounting shafts for the pulleys and drums are not shown for clarity. The drums 16 and 17 are driven by a motor 24. The first drum 16 has alpha grooves 26 and the second drum 17 has beta grooves 28. The alpha grooves 26 have a greater circumference than the beta grooves 28. The drums 16 and 17 are driven together on the same shaft. The pulleys of the first stack of pulleys 18 have first stacked grooves 19. The pulleys of the second stack of pulleys 20 have second stacked grooves 21. The first stacked grooves 19 have a greater circumference than the second stacked grooves 21. The drum 16 is between the first stacked pulleys 18 and the second stacked pulleys 20, and the long axes of all three are parallel in a plane. The first stacked pulleys 18 are adjacent a first end of the slider 14 and the second stacked pulleys 20 are adjacent the opposite end of the slider 14. The slider 14 slides along a track (not shown). At one end of the track 30 is a set of four first end pulleys 10. At the opposite end of the track is a second end pulley 12. Tension in the line 22 is maintained by a spring 36 pulling the second end pulley 12 away from the slider 14. The second end pulley 12 is elevated and tilted at a first angle and thereby aligns with the last groove of the alpha grooves 26 and the first groove of the beta grooves 28. The first end pulleys 10 are attached to the track and tilted at a second angle and thereby aligns with the first groove of the alpha grooves 26 and the last groove of the beta grooves 28. The first end pulleys 10 rotates at the first angle so as the line 22 passes over a last groove of the beta grooves 28 and around the first end pulleys 10, the line 22 is transitioned to pass over a first groove of the alpha grooves 26. The plurality of stacked pulleys 18 rotate at a third angle so as the line 22 comes off the alpha grooves 26 and around the first stacked grooves 19, the line 22 is transitioned to pass over a next groove of the alpha grooves 26. The second end pulley 12 rotates at the second angle so as the line 22 passes over a last groove of the alpha grooves 26 and around the second end pulley 12, the line 22 is transitioned to pass over a first groove of the beta grooves 28. The plurality of stacked pulleys 20 rotate at a fourth angle so as the line 22 comes off the beta grooves 28 and around the second stacked grooves 21, the line 22 is transitioned to pass over a next groove of the beta grooves 28. In a preferred embodiment, the drums 16 and 17 are driven by the motor 24 and the difference in circumference of the alpha grooves 26 and the beta grooves 28 and the difference in circumference of the first stacked grooves 19 and the second stacked grooves 21 causes the slider 14 to move toward one of the first or second end pulleys 10 and 12 by the capstan effect. In this embodiment, four first end pulleys 10 were used. In other embodiments, one, two, three, or more than four pulleys may be used, chosen for convenience of materials availability, manufacturing ability, or simplicity. In this embodiment, the motor 24 is powered by a battery 42.

In this embodiment, a controller 32 controls the motor 24 and receives information from the motor 20, the battery 42, and a position indicator 44. A smart device 38 can transmit 40 instructions to the controller 32, allowing for the user to control operations. The smart device 38 also receives the information from the controller 32, allowing the user to see information from sensors such as battery levels, current draw by the motors, the position of the slider 14 on the track, how much force is exerted on the line, and other typical information desired by users.

Figure 15:
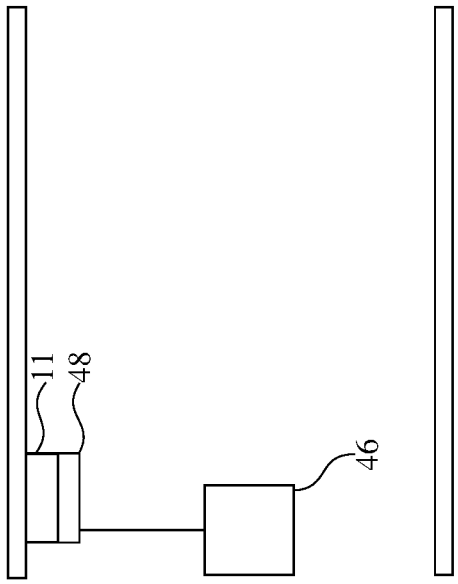
FIG. 15 is a block diagram of a system for lifting an object and moving the object translationally.
Figure 16:
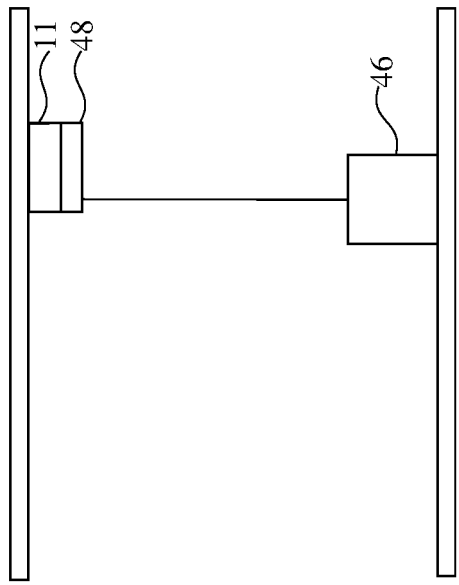
FIG. 16 is a block diagram of the system of FIG. 15, the object lifted.
Figure 17:
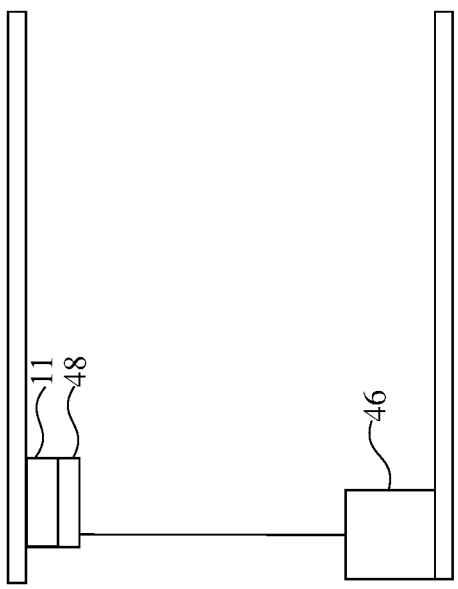
FIG. 17 is a block diagram of the system of FIG. 16, the object moved translationally.
Figure 18:
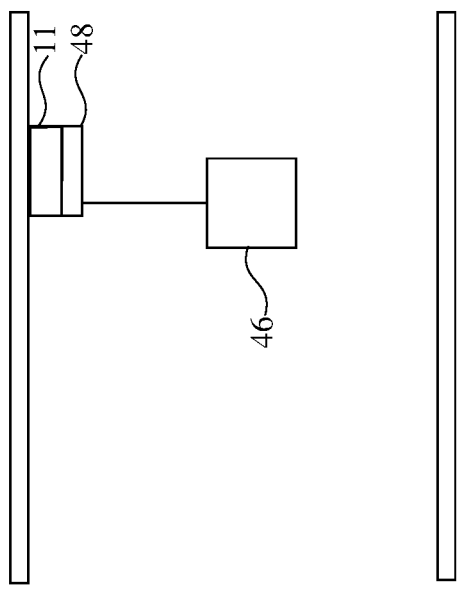
FIG. 18 is a block diagram of the system of FIG. 17, the object lowered to the ground.

FIG. 15 is a block diagram of a system for lifting an object and moving the object translationally that may be used in one embodiment of the present invention. FIG. 16 is a block diagram of the system of FIG. 15, the object lifted. FIG. 17 is a block diagram of the system of FIG. 16, the object moved translationally. FIG. 18 is a block diagram of the system of FIG. 17, the object lowered to the ground. An object 46 is on the ground (FIG. 15), lifted (FIG. 16), moved translationally (FIG. 17) and placed on the ground (FIG. 18). The lifting device 48 is a winch or similar lifter. The lifting device 48 is mounted to a slider 11 that is part of a device as in FIGS. 1-10. In this manner, the object 16 can be elevated, moved, and set in a new location.

The invention has been described with reference to various specific and preferred embodiments and techniques. Nevertheless, it is understood that many variations and modifications may be made while remaining within the spirit and scope of the invention.

What is claimed is:

1. A device for moving an object linearly comprising:
   a line in the form of a loop;
   a slider comprising:
      a plurality of first stacked pulleys with first stacked grooves;
      a plurality of second stacked pulleys with second stacked grooves; and
      a drum with a plurality of alpha grooves alternating with a plurality of beta grooves;
      wherein the circumference of each alpha groove of the drum is greater than the circumference of each beta groove on the drum and the circumference of each first stacked groove is greater than the circumference of each second stacked groove; and
      wherein the long axes of the plurality of first stacked pulleys, the drum, and the plurality of second stacked pulleys are parallel in a plane, the plurality of first stacked pulleys being adjacent a first end of the slider, the plurality of second stacked pulleys being adjacent a second end of the slider, and the drum being between the plurality of first stacked pulleys and the plurality of second stacked pulleys;

a first end pulley rotating at a first angle so as to transition the line passing over a last groove of the beta grooves to pass over a last groove of the alpha grooves;

the plurality of first stacked pulleys rotating at a second angle so as to transition the line passing over the last groove of the alpha grooves to pass over a last groove of the first stacked grooves and onto a previous groove of the alpha grooves;

a second end pulley rotating at a third angle so as to transition the line passing over a first groove of the alpha grooves onto a first groove of the beta grooves;

the plurality of second stacked pulleys rotating at a fourth angle so as to transition the line passing over the first groove of the beta grooves to pass over a first groove of the second stacked grooves and onto a next groove of the alpha grooves;

whereupon when any of the drum, the first end pulley, or the second end pulley is driven, the difference in the circumferences of the alpha grooves and the beta grooves and the difference in the circumferences of the first stacked grooves and the second stacked grooves causes the slider to move toward one of the first or second end pulleys.

2. The invention of claim 1, further comprising a tensioner configured to apply a force on one of the first or second end pulleys away from the other of the first or second end pulleys such that a tension is maintained in the line.

3. The invention of claim 2, wherein the tensioner is a spring.

4. The invention of claim 2, wherein linearly is up and down and the tensioner is a weight pulling one of the first or second end pulleys down.

5. The invention of claim 1, wherein the slider is mounted to a load.

6. The invention of claim 1, further comprising a motor that drives the drum.

7. The invention of claim 6, further comprising sensors that transmit information to the smart device, the sensors transmitting information selected from the group consisting of a force on the line, a position of the line in the device, power remaining in a battery that drives the motor, current draw by the motor, and combinations thereof.

8. The invention of claim 6, wherein the motor is powered by a battery.

9. The invention of claim 1, wherein the line is selected from a group consisting of a braided wire, a wire, a rope, a cord, a string, twine, a cable, and a strand.

10. The invention of claim 1, wherein the slider moves along a track.

11. The invention of claim 10, wherein the track is mounted to a ceiling and a winch is mounted to the slider.

12. The invention of claim 1, wherein surfaces of the first stacked grooves, the second stacked grooves, the alpha grooves, the beta grooves, or a combination thereof are rough, resulting in increased frictional gripping of the line by the surfaces.

13. The invention of claim 1, wherein a first of the alpha grooves has a greater circumference than a remainder of the alpha grooves, a first of the beta grooves has a greater circumference than a remainder of the beta grooves, or both.

14. A system for moving an object linearly comprising a plurality of the devices of claim 1, the slider mounted on at least two opposing faces of the object.

15. The invention of claim 14, wherein each of the plurality of the devices comprises a motor that drives any of the drum, the first end pulley, or the second end pulley.

16. The invention of claim 15, further comprising a controller configured to receive instructions and transmit a signal to the motors to move the object towards the first end pulleys or the second end pulleys.

17. The invention of claim 16, wherein the object comprises an elevator and further comprising a set of buttons that transmit the instructions to the controller.

18. The invention of claim 16, further comprising a smart device configured to transmit instructions to the controller.

19. A device for moving an object linearly comprising:
a line in the form of a loop;
a slider comprising:
    a plurality of first stacked pulleys with first stacked grooves;
    a plurality of second stacked pulleys with second stacked grooves;
    a first drum with a plurality of alpha grooves;
    a second drum with a plurality of beta grooves; and
    wherein the circumference of each alpha groove of the first drum is greater than the circumference of each beta groove on the second drum and the circumference of each first stacked groove is greater than the circumference of each second stacked pulleys; and
    wherein the long axes of the plurality of first stacked pulleys, the first drum, the second drum, and the plurality of second stacked pulleys are parallel in a plane, the plurality of first stacked pulleys adjacent a first end of the slider, the plurality of second stacked pulleys adjacent a second end of the slider, and the first drum and second drum adjacent and parallel each other and between the plurality of first stacked pulleys and the plurality of second stacked pulleys;
a first end pulley rotating at a first angle so as to transition the line passing over a last groove of the beta grooves to pass over a first groove of the alpha grooves of the drum;
the first stacked pulleys rotating at a second angle so as to transition the line passing over the alpha grooves of the drum onto a next groove of the alpha grooves;
a second end pulley rotating at a third angle so as to transition the line passing over a last groove of the alpha grooves onto a first groove of the beta grooves of the drum;
the second stacked pulleys rotating at a fourth angle so as to transition the line passing over the beta grooves of the drum onto a next groove of the beta grooves;
whereupon when any of the drum, the first end pulley, or the second end pulley is driven, the difference in the circumferences of the alpha grooves and the beta grooves and the difference in the circumferences of the first stacked grooves and the second stacked grooves causes the slider to move toward one of the first or second end pulleys.

20. The invention of claim 19, wherein the first end pulley comprises two or more pulleys in a plane at the first angle, the second end pulley comprises two or more pulleys in a plane at the third angle, or both.

* * * * *